(12) United States Patent
Lang et al.

(10) Patent No.: US 8,856,863 B2
(45) Date of Patent: Oct. 7, 2014

(54) METHOD AND SYSTEM FOR RAPID ACCREDITATION/RE-ACCREDITATION OF AGILE IT ENVIRONMENTS, FOR EXAMPLE SERVICE ORIENTED ARCHITECTURE (SOA)

(75) Inventors: Ulrich Lang, San Francisco, CA (US); Rudolf Schreiner, Munich (DE)

(73) Assignee: Object Security LLC, Palo Alto, CA (US)

( * ) Notice: Subject to any disclaimer, the term of this patent is extended or adjusted under 35 U.S.C. 154(b) by 138 days.

(21) Appl. No.: 12/997,462

(22) PCT Filed: Jun. 10, 2009

(86) PCT No.: PCT/US2009/046964
§ 371 (c)(1),
(2), (4) Date: Dec. 10, 2010

(87) PCT Pub. No.: WO2009/152282
PCT Pub. Date: Dec. 17, 2009

(65) Prior Publication Data
US 2011/0093916 A1    Apr. 21, 2011

Related U.S. Application Data

(60) Provisional application No. 61/060,125, filed on Jun. 10, 2008, provisional application No. 61/141,691, filed on Dec. 31, 2008, provisional application No. 61/155,721, filed on Feb. 26, 2009.

(51) Int. Cl.
*G06F 21/00* (2013.01)
*G06F 21/57* (2013.01)
*H04L 12/24* (2006.01)
*H04L 29/06* (2006.01)

(52) U.S. Cl.
CPC .......... *H04L 63/1433* (2013.01); *H04L 41/145* (2013.01); *G06F 21/57* (2013.01); *G06F 2221/2101* (2013.01); *H04L 63/20* (2013.01)
USPC .......... 726/1; 726/4; 726/18; 726/23; 726/25; 713/152; 713/153; 713/190

(58) Field of Classification Search
USPC ............................................................ 726/1
See application file for complete search history.

(56) References Cited

U.S. PATENT DOCUMENTS

| | | | | |
|---|---|---|---|---|
| 7,089,581 B1 * | 8/2006 | Nagai et al. | ...... | 726/1 |
| 7,478,428 B1 * | 1/2009 | Thomlinson | ...... | 726/22 |
| 7,712,137 B2 * | 5/2010 | Meier | ...... | 726/25 |
| 7,716,716 B1 * | 5/2010 | Boystun | ...... | 726/1 |
| 8,010,803 B2 * | 8/2011 | Pedersen et al. | ...... | 713/190 |
| 8,046,819 B2 * | 10/2011 | Khin et al. | ...... | 726/1 |

(Continued)

*Primary Examiner* — Kambiz Zand
*Assistant Examiner* — Yonas Bayou
(74) *Attorney, Agent, or Firm* — Muncy, Geissler, Olds & Lowe, P.C.

(57) ABSTRACT

A system and method for managing and analyzing security requirements in reusable models. At least one functional model, at least one security implementation model, at least one requirement model, and meta models of the models are read by a reader. A correspondence between the functional model, security implementation model, and the requirements model is analyzed, whereby the correspondence indicates that compliance/security/accreditation requirements defined in the requirement model match with security objectives implemented by controls defined by the security implementation model. Next, it is determined whether correspondence is or is not given based on the analysis of the correspondence and then evidence is generated based on the analysis of the correspondence and the determination and the impact of changes is analyzed.

20 Claims, 5 Drawing Sheets

(56) References Cited

U.S. PATENT DOCUMENTS

| | | | |
|---|---|---|---|
| 2003/0004754 A1* | 1/2003 | Krutz | 705/2 |
| 2005/0273860 A1 | 12/2005 | Chess et al. | |
| 2007/0162890 A1* | 7/2007 | Meier et al. | 717/100 |
| 2007/0168929 A1* | 7/2007 | Larvet et al. | 717/104 |
| 2007/0199050 A1* | 8/2007 | Meier | 726/4 |
| 2007/0204346 A1* | 8/2007 | Meier | 726/25 |
| 2009/0077621 A1* | 3/2009 | Lang et al. | 726/1 |
| 2010/0132873 A1* | 6/2010 | Lang | 156/64 |

\* cited by examiner

METHOD AND SYSTEM FOR RAPID ACCREDITATION/RE-ACCREDITATION OF AGILE IT ENVIRONMENTS, FOR EXAMPLE SERVICE ORIENTED ARCHITECTURE (SOA)

This application is a national stage of International application no. PCT/US2009/046964, which claims priority to U.S. Provisional Application Nos. 61/060,125, 61/141,691, and 61/155,721, which were filed on Jun. 10, 2008, Dec. 31, 2008, and Feb. 26, 2009, respectively, and which are all incorporated herein by reference.

BACKGROUND OF THE INVENTION

1. Field of the Invention

Exemplary embodiments of the present invention are directed to a method and system for managing compliance/assurance and security requirements in reusable models, and for demonstrating the traceable correspondence between those requirements and effective security implementation across the information technology (IT) system. The present invention can define, edit, merge and process requirement models; can collect, analyze and document IT system and security evidence; and can analyze evidence about changes to an IT system and its security; and can provide decision support to humans. The invention also facilitates the automation of a large part of what is known in the industry as an evaluation/accreditation or compliance management process. Embodiments of the invention are also relevant for IT systems that are dynamically evolving over a system lifecycle, which can be referred to as "agile" IT systems.

2. Description of the Related Art

Conventional security and compliance accreditation of IT systems (typically called "Target of Evaluation", TOE) currently involves a human security evaluator who documents evidence and verifies whether the IT system is in line with the requirements (typically called "Security Target", ST) by using different methods, for example, by testing or formal analysis.

The security requirements for example state that all data communication has to be protected for integrity (no modification of data) and confidentiality (no disclosure of data). The human evaluator then checks whether the system really meets these requirements, for example whether the communication is encrypted and whether a so-called hash function is applied, which provide confidentiality and integrity of communication, respectively.

The following exemplary analogy helps to understand this evaluation process: the construction of a house is based on a set of blueprints describing specific aspects of the house, for example the walls, doors and windows, or its electrical or heating system. These blueprints are models of specific aspects of the house. The blueprints use specific symbols known to one skilled in the art, for example an architect or electrician, such that the person is able to understand their meaning. For different aspects, specific sets of symbols are used, for example the architect and the electrician use different sets of symbols.

Model Driven Software Engineering (MDE) uses a similar approach. Specific sets of symbols, here called Domain Specific Languages (DSLs), are used to describe (instead of symbols for doors and windows) the parts of a software system as models, for example, of functional aspects like data formats, services, interfaces, interactions or sequences of actions. Unlike civil engineering, in MDE it is possible to directly generate large parts of the IT systems from the models, for example source code and configuration files. Similarly, it is possible to generate security enforcement from security models (using Model Driven Security, which is described further below). This ensures, to speak in terms of the analogy, that the building exactly matches the blueprints and that it is sufficient to analyze the blueprints in order to evaluate that the building meets a specific criteria.

Model Driven Security (MDS) as described in U.S. patent application Ser. No. 12/126,711, which is incorporated herein by reference, is directed to the automatic generation of machine enforceable security rules from security policies expressed close to human thinking (i.e. which are potentially not machine enforceable). MDS applies the concepts of MDE to security. Using MDE, there is a high probability that IT systems match the functional models. Similarly, using MDS, there is a high probability that IT systems security matches the security models.

Both houses and IT systems have to comply with specific requirements and legal regulations, which depend on many factors. For example, a house that is built in an area with a high risk of earthquakes needs to be built in a stronger way than a house built in an area with a low risk of earthquakes.

In the state of the art of IT compliance, these security and compliance regulations are described in a informal text, which cannot be processed by an IT system. A human evaluator therefore has to (manually) verify whether the IT system (or a house in the analogy) is in line with the security and compliance requirements. This is of course a difficult and error prone process that requires a lot of human effort.

A conventional process for evaluating correspondence between the IT system security and the security requirements (i.e. the security and compliance evaluation/accreditation/compliance process) involves significant manual effort (i.e. no automation), and the probability that the accreditation matches the operational IT system security is low or unclear. This is because the manual evaluation process does not tie into automated, verifiable processes such as Model Driven Software Engineering (MDE) and/or Model Driven Security (MDS).

Today there are many DSLs to describe systems, e.g. file formats of different Computer Aided Design (CAD) programs, or country or profession specific sets of symbols used for a construction of a house, or different modeling languages for IT systems, such as UML, SysML or BPMN. In the conventional art, security related information for security enforcement is added directly into these specific functional DSLs (e.g. as annotations in functional models or as compliance policies expressed in the terms of a specific functional DSL). Unfortunately this greatly limits the reuse of compliance, security and accreditation polices, because the security related information is then always bound to a specific DSL and model.

Both IT systems and buildings (in the analogy) are typically changed over their life cycle. Then, except in simple cases already foreseen and planned for in the initial accreditation, it is necessary to "re-accredit" the systems, i.e. to check whether particular changes impact the compliance accreditation or not. For example, if important electrical equipment such as an air conditioning system has to be replaced in a building, then this potentially impacts the accreditation of the building as a whole. The new equipment might have a higher weight and a higher consumption of energy. It is necessary to verify that the building is still able to provide the required functionality, e.g. whether the weight of the new equipment is a risk to the statics of the building or whether enough electrical power can be provided. However, in the case where the new equipment is, from a compliance and accreditation point of view, equivalent to the old equipment, then a full re-accreditation is not required. Conventionally, this has to be manually verified, e.g. by comparing the data sheets of the new equipment.

The analogy and discussion so far illustrate the important concept that information security is not only about implementing security across IT systems and applications according to security requirements. It is often also necessary to demonstrate the level of confidence that IT system security complies with the stated security requirements. This is called "compliance" or "information assurance" (and involves "evaluation" and "accreditation" processes).

Civilian and government compliance examples include best practices, laws and regulations, e.g. ITILv3/ISO2700x, ISMS, COBIT for security management; privacy legislation, healthcare legislation such as HIPAA, payment card processing such as PCI, safety standards and regulations such as ISO 26262, DO 178B or EN50128 for safety, accounting/auditing regulations such as Sarbanes-Oxley.

More rigorous government information assurance examples include the "Common Criteria" (CC) standard ISO/IEC 15408, a framework in which computer system users can specify their security requirements, vendors can then implement and/or make claims about the security attributes of their products, and testing laboratories can evaluate the products to determine if they actually meet the claims. In other words, CC provides assurance that the process of specification, implementation and evaluation of a computer security product has been conducted in a rigorous and standard compliant manner. Common Criteria evaluations are performed by "accredited" human evaluators and organizations. Evaluations are performed on computer security products and systems called "Target Of Evaluation" (TOE). The "evaluation" serves to verify claims made about the target's security features. This is commonly done through a manual process that involves a number of documents: (1) A "Protection Profile" (PP) identifies security requirements for a class of security devices; (2) A "Security Target" (ST) identifies the security properties of the TOE. It may refer to one or more PPs. The TOE is evaluated against the SFRs and SARs (see below) established in its ST, no more and no less. This allows vendors to tailor the evaluation to accurately match the intended capabilities of their product. (3) "Security Functional Requirements" (SFRs) specify individual security functions which may be required by a product, e.g. authentication or access control. (4) "Security Assurance Requirements" (SARs)—descriptions of the measures taken during development and evaluation of the product to assure that the claimed security functionality works as intended. The evaluation process tries to establish the level of confidence that may be placed in the product's security features through quality assurance processes; (5) "Evaluation Assurance Level" (EAL)—the numerical rating EAL1-EAL7 describing the depth and rigor of an evaluation. Higher EALs do not necessarily imply "better security", they only mean that the claimed security functionality of the TOE has been more extensively validated.

Today's compliance/security assurance methods were originally developed to accredit the security of static complete (i.e. siloed, monolithic) systems which may be reconfigured within certain and well as defined limits, but do not change in unforeseen ways. However, today's IT architectures support agile interconnected networked ("distributed") applications to meet changing business demands and evolve over the whole system life time. Example architectures include Service Oriented Architecture (SOA), Web 2.0 and mash-ups, Cloud Computing, SaaS/PaaS, Grid Computing. Examples for agile application development include model-driven, process-led software development and integration (e.g. Model Driven Architecture (MDA), Model Driven Software Engineering (MDE), and executable Business Process Management (BPM). An example of an agile application aspect is application interactions, such as SOA service interactions and BPM interactions.

Security methods and systems are typically important for such IT architectures and also need to support agility. There are many efforts to use model-driven approaches for non-functional system aspects to improve for example (1) the safety and security of systems, e.g. using the abovementioned Model Driven Security (MDS) for agile security policy management, (2) the assessment of risks, (3) evaluation and accreditation, and (4) compliance with legal and regulatory requirements.

Conventional compliance/security/accreditation methods fail for such dynamically changing ("agile") IT systems. This is because changes may impact the security properties of the system in such a way that the system does not comply with the required level of compliance/assurance anymore. In such a case it is necessary to "re-accredit", i.e. to analyze (i.e. "re-evaluate") the impact of the changes and potentially mandate updates to the IT systems. Today, this is a time-consuming, manual process which is not sufficiently fast and cheap to support the agility of today's IT systems.

Particularly time-consuming manual, paper-based compliance/security processes include:

(1) Documenting and processing compliance/security requirements. Even if a model-driven approach to development and security is used, compliance related information is conventionally simply tagged to the related model elements in the functional model itself. This has several disadvantages: Compliance information is not described generalized, application/platform independent. Instead it has to be described as a single, large model at the low abstraction layer of the functional system model and bound to a specific application, and it is not possible to easily associate specific sets of model elements (e.g. "All information flow") with a given compliance element (e.g. "All information flow over public network has to be protected"), or associate/aggregate model elements describing accreditation related information;

(2) Collecting, documenting compliance/security evidence in a timely, correct, and consolidated fashion;

(3) Analyzing compliance/security evidence to identify whether the IT system and its IT security meet the documented requirements. This has to be one initially, and again after each unforeseen change to the IT system and its security; and/or (4) Manual corrections may be necessary if the analysis identifies that the compliance/security requirements are not met (e.g. to the IT system, the security, the compliance/security requirements).

SUMMARY OF THE INVENTION

Exemplary embodiments of the present invention are directed to a method and system for defining, editing and managing compliance/assurance and security requirements in reusable models, and for demonstrating the traceable correspondence between requirements and effective security implementation and enforcement.

In exemplary embodiments, the present invention can define, edit, merge and processes requirement models; collect and document information technology system and security evidence; analyze evidence about changes to an IT system and its security; and/or provide decision support to humans. An objective is to automate a large part of what is known in the industry as an evaluation/accreditation or compliance management process, which is particularly relevant for dynamically evolving ("agile") IT systems.

In an embodiment a method for managing and analyzing security requirements in reusable models is provided, whereby at least one functional model, at least one security implementation model, at least one requirement model, and/or meta models of the models are read. A correspondence is analyzed between the functional model, security implementation model, and the requirements model, the correspondence indicating that requirements defined in the requirement model match with security objectives implemented by controls defined by the security implementation model. Then, it is determined whether correspondence is or is not given based on the analysis of the correspondence and evidence is generated based on the analysis of the correspondence and the determination.

Also, in a further embodiment, changes to an IT system and their security can be detected and analyzed. Current or previously stored evidence versions relating to the IT system are read. The current evidence versions are normalized and stored. One or more previously stored versions of the normalized evidence are read and differences are then identified between the read normalized evidence versions. Thereafter, it is determined whether or not a change has been detected based on the identified differences between the read normalized evidence versions.

In another embodiment, the evidence version can include at least: models, including a high-level IT system design, low-level detailed functional IT system description, security policy, requirements, which include vulnerabilities, threats, threat agents, controls, control objectives risks, attack trees and/or other compliance accreditation requirements. The evidence version can also include model transformations that can include model driven security transformations, model driven software development model transformations, and/or model-driven compliance model transformations. The evidence version can further include model transformation outputs including low-level security rules and configurations, and/or low-level IT system(s) design. Even further, the evidence version can include runtime events information including security events and/or system events and/or development lifecycle information.

The detected changes can be displayed on a display device, printed, communicated to one or more IT systems, and/or provided to a decision support tool.

For evaluating change policies, an embodiment of the present invention provides that at least one change policy is read and evaluated for data about changes detected and analyzed. It is then determined whether the changes violate the change policy or not.

Another embodiment provides an apparatus for managing and analyzing security requirements in reusable models. The apparatus can include at least one storage device, a functional model reader, a security implementation model reader, a requirement model reader, a correspondence analyzer for analyzing a correspondence between the functional model, security implementation model, and the requirements model. The correspondence can indicate that requirements defined in the requirement model match with security objectives implemented by controls defined by the security implementation model. Also provided is a correspondence evidence documenter for generating electronic data representing evidence based on the analysis of the correspondence.

The functional model, according to an embodiment, can define a functional portion of an IT system, which includes services, components, applications, or host machines. The security implementation model can define security relevant portions of the IT system, and the requirement model can define a compliance, accreditation and security requirements.

In a further embodiment, a correspondence decider can determine whether correspondence is or is not given based on the analysis of the correspondence analyzer. Also, a decision support tool can be provided for providing electronic data representing evidence based on an analysis of the correspondence to an operator readable medium, which can include a display device.

In yet a further embodiment, a current evidence normalizer is provided for normalizing an evidence. A change detector can also be provided for identifying a difference between at least two normalized evidence versions, and a change policy decider can provide an operator with information based on identified differences between the at least two normalized evidence versions.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Figure 1:
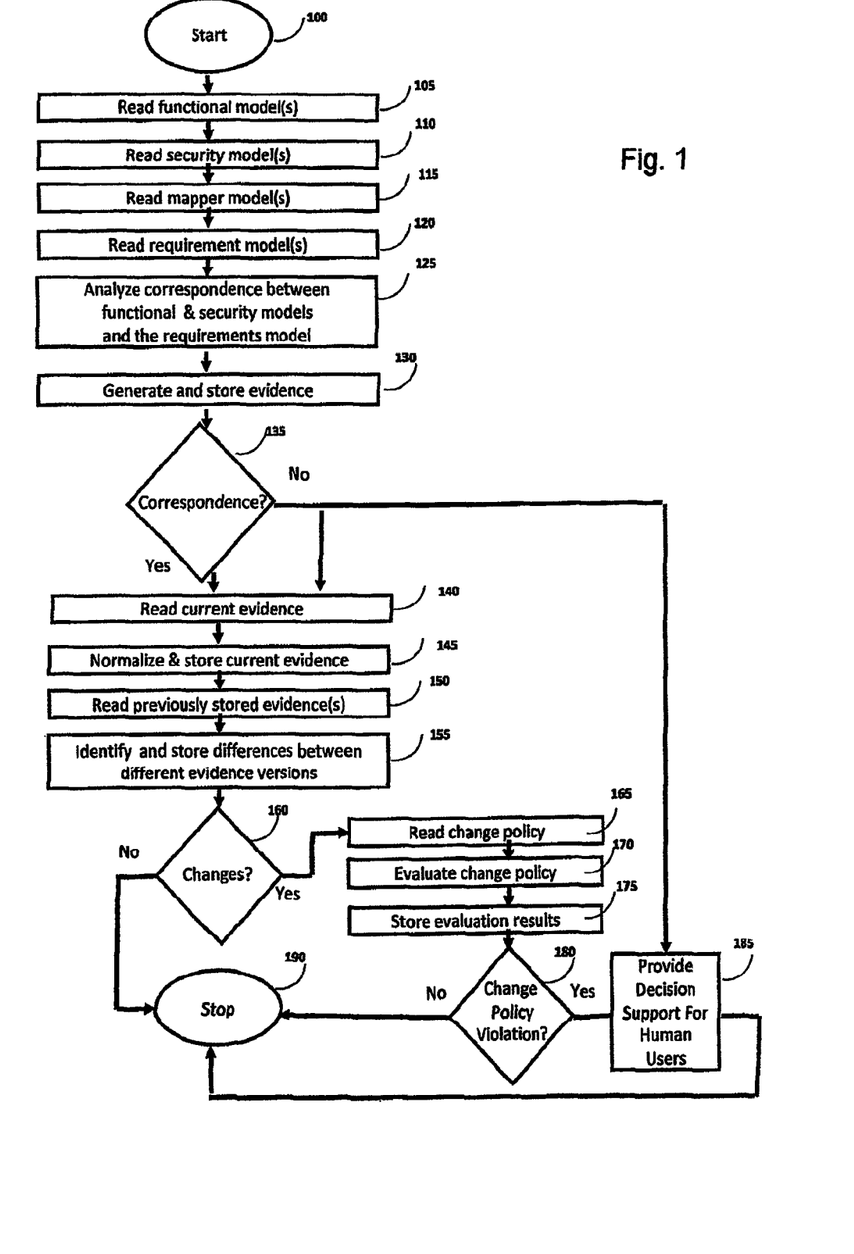
FIG. 1 illustrates a flow chart according to an embodiment of the present invention.

A method and system is illustrated for defining, editing, and managing compliance/assurance and security requirements in abstract and reusable models, and for demonstrating the traceable correspondence between these requirements and effective security implementation of a concrete, potentially dynamically changing IT product or system. A feature of the invention is to automate a large part of what is known in the industry as a (mostly manual) evaluation/accreditation or compliance management process. This is particularly relevant for dynamically changing ("agile") IT systems. FIG. 1 illustrates a model-driven security accreditation and model-driven compliance method and system as a flow chart.

It was noted above that conventional information assurance/compliance evaluation is a manual, time-consuming and error-prone process. While illustrated for the particular exemplary security compliance and information assurance use case, the illustrated method and system can be used to automate the demonstration of all general compliance with many non-functional system properties (as defined in the above-mentioned Model Driven Security patent application), for example safety, Quality of Service (QoS), Service Level Agreements (SLAs) etc. As mentioned, a main feature of the method and system according to an embodiment of the invention is to automate large parts of the evaluation alongside an MDE process (and optionally an MDS process): First of all, human specialists describe the requirements in a formal way using an appropriate DSL, which can describe requirements like "All communications have to be protected for integrity and confidentiality", very similar to "All electrical wires shall at least support a current of 16 A" in the analogy described above. This formal description of the requirements in a DSL now can automatically be processed similar to any other models involved in model-driven development (e.g. the functional model of the IT system). It is now possible to automatically verify for each model element of the functional model and the security implementation model whether they meet the requirements defined in the requirements model. For example, in the analogy presented above, each wire is checked whether it is thick enough to support a current of 16 A, as defined in the requirements model. The result of this automatic comparison is accreditation and evaluation evidence and documentation. The evaluation process can be fully automated if the information stored in the models is sufficient to fully assess whether a requirement is met. Otherwise, if additional information (for example assumptions, or testing from outside the models) is required, it can be assisted by the human evaluator.

It was also noted above that conventionally, security, compliance, and accreditation policies are defined directly within functional models. As opposed to that approach, this method and system allows the definition of compliance, security and accreditation policies in separate models expressed in their respective own specific Domain Specific Language (DSL), e.g. based on the terms of the problem, the description of assets and their relationships, threats, threat agents, risks etc. Such a DSL is completely independent of the functional model and DSL. For example (in the analogy), the polices are defined in terms of assets like "walls" and "doors", instead of the modeling technology, platform and tool specific functional models elements or parts of the files storing these models or information, or from country or profession specific sets of symbols. The abstract elements of the compliance, security and accreditation models and of the functional models are linked with each other using a separate mapping model providing a common vocabulary with mappings to the specific elements of the meta models or the DSLs. As also noted in the above example, both IT systems and buildings (in the analogy) are changed over their life cycle and often require a re-accreditation. The method and system according to the present invention allows to automatically check whether a change has an impact on an accreditation by comparing the changes with a "change policy". If the changes are within the limits of the change policy, full re-accreditation is not required. For example, if (in the analogy) the newly installed air conditioning system has the same weight and power consumption, then a re-accreditation is not necessary.

Figure 5:
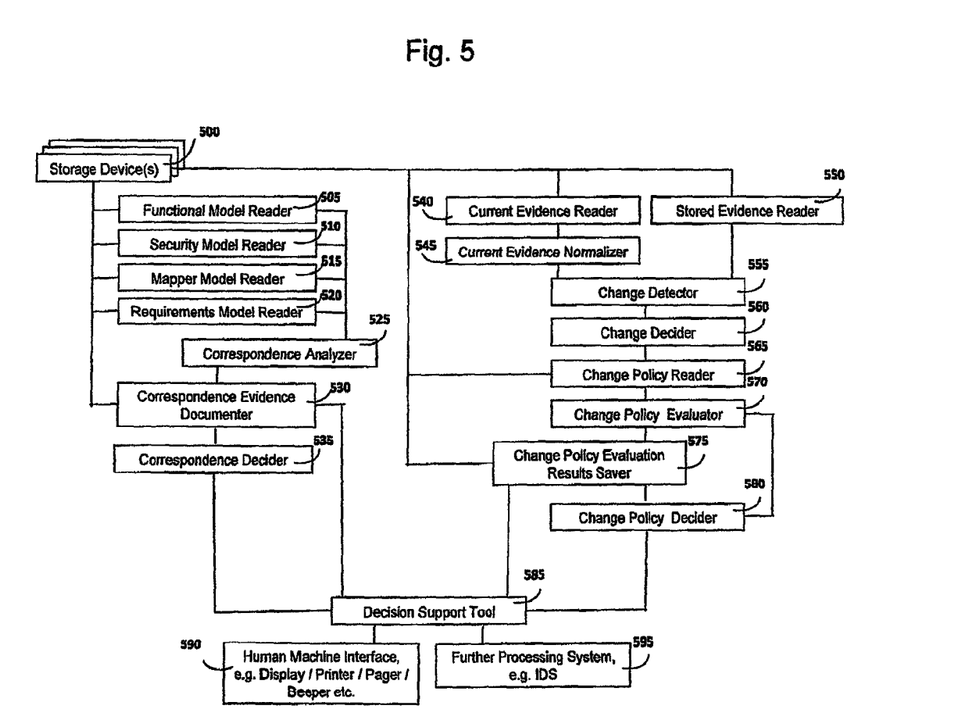
FIG. 5 is a block diagram illustrating an embodiment of the present invention.

The following description provides an overview of the flowchart depicted in FIG. 1 and the functional blocks depicted in FIG. 5.

Steps 105, 110, 115, 120, 125, 130, and 135, which are implemented in 500, 505, 510, 515, 520 and 525, automatically verify that the security of the IT systems match stated requirements. These stated requirements can be predetermined.

The flowchart depicted in FIG. 1 starts at step 100, where a human user or a machine initiate the execution of the method and system (e.g. by launching a software application, after a lapsed time period, or as a response to a particular event (e.g. activity detected in a development tool, orchestration tool, administration tool). Next, the "functional model reader" (505) reads one or more functional models in step 105 from a "storage device" (500) (e.g. from a hard disk or a remote network location) that describes the functional parts of the IT systems (e.g. services, components, applications, host machines) and how they relate (e.g. SOA service interactions, BPM workflow interactions). Models can for example be defined based on meta-models (which are also called Domain Specific Languages, DSL) and meta-meta models to allow automated processing. In this case, the meta-models of the models used are also read in from a "storage device" (500) together with the models (For the sake of simplicity, this is not shown in the figures). Functional models should not contain any security or requirement model elements, because of the disadvantages outlined in the background section. However, it is also possible to include security and requirements model elements in the functional models. The "security model reader" (510) then reads one or more security models 110 from the storage device (500) (e.g. from a hard disk or a remote network location) that describes the security relevant parts of the IT systems. Such security models should be defined in a generalized (i.e. independent of the specifics of other models such as the functional model read in 105) fashion, although definitions are possible that directly relate to the particular functional model(s) 105.

The "mapper model reader" (515) then reads one or more mapper model(s) 115 from the storage device (500) (e.g. from a hard disk or a remote network location) that describe the relation between the elements of the functional model(s) 105, the security model(s) 110, and the requirements model(s) 120. The mapper models enable users to define generalized security model(s) 105 and requirement model(s) 120 independent of the particular functional model(s) 105. The mapper models 115 enable model re-use, flexibility, technology-independence, and abstraction layer independence.

The "requirements model reader" (520) then reads one or more requirements models 120 from the storage device (500), which define the compliance, accreditation and security requirements. It is noted that steps 105, 110, 115, and 120 can be carried out in any order.

In step 125, it is verified using the "correspondence analyzer" (525) that the IT system security implementation traceably corresponds to the stated requirements. In step 125, taking into account the read mappings defined in the mapper model(s) 115 (and the functional 105, security 110, and requirements 120 models) a "correspondence analyzer" (525) relates as many model elements as possible across all read models 105, 110, 120. The sum of all related model elements across all read models 105, 110, 120 forms a merged model (spread across several models) that contains all the information and all correspondence between model elements. In step 125, the correspondence analyzer then analyzes the correspondence of the functional model(s) and security implementation model(s) elements (105 and 110) with the requirement models 120.

In step 130 a "correspondence evidence documenter" (530) documents the results of this analysis as evidence, and makes it available to other systems (e.g. for further processing) or to a human user, e.g. by storing it on a hard drive or network storage in a suitable data format, or by displaying it on a display.

In step 135, a "correspondence decider" (535) decides according to the results of the correspondence analysis 125 whether the results identify the correspondence or if the results identify that there is no correspondence. Thereafter, the "correspondence analyzer" (525), the "correspondence evidence documenter" (530) and/or the "correspondence decider" (535) provides the generated and documented results of the correspondence analysis 125 to the "decision support tool" (585), which communicates (e.g. displays on a screen) the evidence 130 to human specialists (accreditors) 185 to support decision making in step 185. In addition, it then triggers the execution of the "current evidence reader" (540) in step 140, which reads all current evidence (described in the details section below). In the case where correspondence is identified in step 135, it also triggers the execution of the "current evidence reader" (540) in step 140, which reads all current evidence.

Note that in model-driven, process-led software development approaches, there is a high degree of confidence that the operational software matches with the functional models, because the running software has been automatically generated from the functional models (using MDE). In the same way, there is also a high degree of confidence that the security implementation matches the security implementation models (because MDS is used). Therefore, the input models read in steps 105, 110, 115, and 120 have a very high probability to match with the actual implementation and operation of the running IT systems.

One of the features of the present invention, as illustrated in FIG. 1 steps 140, 145, 150, 155, 160, 165, 170, 175, and 180 is to: (1) automatically document comprehensive evidence about the functionality of the IT systems, about their security implementation, and about the security requirements; (2) automatically detect changes and their implications (including consequential implications) to the IT systems and their security across all layers, including the model layers, the model transformations layer, and the IT systems/security layer (see FIG. 2), and document those changes; and (3) evaluate based on "change policies" whether a change would void the current compliance/assurance certification.

Figure 2:
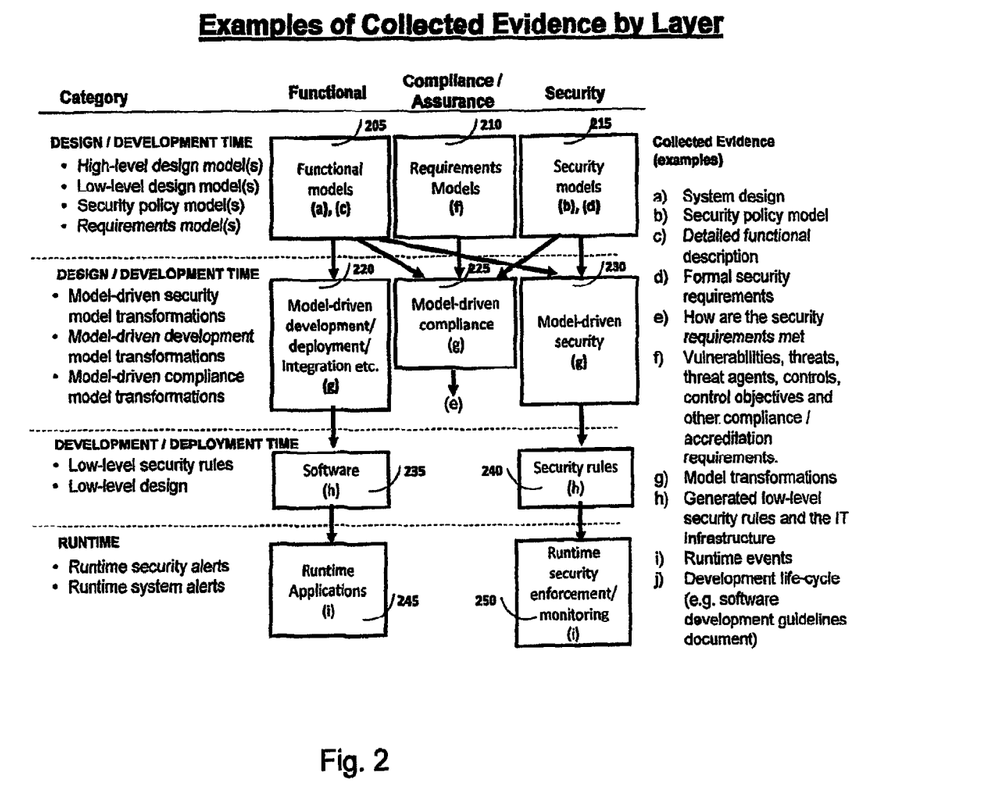
FIG. 2 illustrates types of evidence collected according to an embodiment.

In step 140, the "current evidence reader" (540) reads various information (referred to as "evidence") about the current deployment and operation of the information technology (IT) systems and about their security across all layers, including the model (functional and security/compliance) layers, the model transformations layer, and the IT systems/security layer (see FIG. 2).

In step 145, the "current evidence normalizer" (545) processes all the evidence and restructures it into a form that can be compared to previously collected evidence, i.e. in a form that is consistent, repeatable, and without repetition of information. Such a form can be referred to as "normalized" evidence. Evidence is normalized if it is exactly in the same syntax and order, even if the evidence has been collected in a different order or with repetition or in a different syntax or by a different collection method. The "current evidence normalizer" (545) can achieve normalization in different ways, for example by mapping read syntax into its own standard syntax, and by sorting all evidence elements by their category (e.g. runtime security incident alert, application interaction in functional model), and according to a preferred ordering method within each category (e.g. sorting alphabetic and sorting left over right). The "current evidence normalizer" (545) can optionally also store (in step 145) the normalized evidence for future use.

In step 150, a "stored evidence reader" (550) reads previously collected, normalized and stored evidence versions. For the purpose of this explanation, the current evidence (collected in step 145) is referred to as version "n", and stored evidence versions are referred to as numbered versions lower than "n". The stored evidence reader could for example read the previous evidence (i.e. the evidence collected before the current evidence), which is numbered "n−1", for the purpose of comparing it with the current evidence to detect current changes. In other examples, the stored evidence reader could also read any other previously collected, normalized and stored evidence, such as "n−2", "n−3" etc., for example to analyze the impact of changes over time. The stored evidence reader could also read several versions of previously collected, normalized and stored evidence, for example, to analyze changes that happened at a particular point in the past (e.g. comparing "n−5" with "n−6").

In step 155 the "change detector" (555) identifies the differences between the different read normalized evidence versions. Depending on which evidence versions have been read, it for example identifies the differences between the current normalized evidence version (numbered "n") and the last normalized evidence version (numbered "n−1"), to detect any changes. Additionally, or alternatively, for example, differences in past versions (e.g. "n−10" and "n−11") are analyzed. In the case where no current evidence is analyzed, steps 140 and 145 are optional because no current evidence is analyzed by the change detector. In step 155 the change detector also stores evidence that contains all identified changes in a normalized form. Furthermore, in step 155, the "change detector" (515) also stores explicitly flagged changes (e.g. by a development tool as a result to a change, or by a runtime system monitoring or incident monitoring tool).

In step 160, if a "change decider" (560) decides that no changes have been detected, the method and system stops in step 190 until a next iteration is triggered (starting from 100). If the "change detector" (555) detected changes (including indirect consequential changes) in step 155, the change decider executes the "change policy reader". The "change policy reader" (565) reads a "change policy" in step 165 which includes one or more change policy rules. Change policy rules define which changes 155 do or do not impact the compliance/assurance level.

In step 170 a "change policy evaluator" (570) evaluates the change policies read in step 165, for example, by iterating through all elements of the normalized changes evidence 155 and comparing it with the corresponding elements of the change policy rules 165 (or for example vice-versa, i.e. iterating through all change policy rules and comparing it with the corresponding elements of the normalized change evidence). For example, if a normalized change evidence element indicates a change of an interaction between two networked applications such as SOA services, the change policy evaluator will search for a particular interaction related change policy rule in step 170. For example, a rule could state that interaction changes do not impact the compliance, security or assurance level if the security level on both sides of a Multi-Level Security (MLS) controlled interaction remain the same (e.g. "secret" interaction of one "secret" application with another "secret" application).

In step 175, a "change policy evaluation results saver" (575) stores the evaluation results, including, the changes, the particular rules applied, and the results.

In step 180 a "change policy decider" (580) decides: if no changes have been detected, the change policy decider stops the method and system in step 190 until a next iteration is triggered (starting from 100). If the "change policy decider" detected that change policies were violated, it provides the stored evaluation results 175 to human user within a "decision support tool" (585) in step 185 that helps the human user to manually carry out necessary corrections and re-accredit the compliance/assurance level of the IT system, e.g. using a "human machine interface" (590). It is for example also possible to provide the stored evaluation results to an Intrusion Detection System (IDS) (595) or other software and devices for further processing.

The described method and system is applicable to all model-driven approaches in general, because model-driven approaches provide the means to produce the required traceable evidence about models and system artifacts. It uses generic modeling and meta-modeling methods and concepts as described in U.S. patent application Ser. No. 12/126,711 to support the specification of flexible/extensible policies The following describes particular details about the method and system outlined above:

Details—Evidence Collection & Generation

Steps 100 to 130 in FIG. 1 automatically generate (and optionally store) supporting evidence and documentation about the traceable correspondence between the security requirements and security implementation of a system whenever a system is built, deployed, or changed.

One main input to the evidence generation is the functional model 105 of the system. It describes the functional aspects of the system, for example data formats, interfaces, services, service interactions or deployments of service implementations. The functional model is expressed in a general purpose modeling language such as UML, SysML or BPMN, or a Domain Specific Language (DSL) tailored to the specific needs of the application, and often specific to the middleware platform used for the implementation of the system. The functional model and its meta model (also called Domain Specific Language) describing the functional model are read in from storage (500) (hard disk, network storage, tape, USB stick, etc.) in step 105.

A security implementation model 110 describes how the system is protected. It includes a description of the controls and security policies of the system, for example information about authentication, authorization, access control, encryption or logging and which security objectives the controls implement, for example confidentiality of communication or integrity of data. The security implementation model can be generated from the security configuration (e.g. by reading in the access control rules) of the system, or from the models used to generate these configurations by model transformation (for example as described in the abovementioned Model Driven Security patent application). Both approaches are equivalent, because Model Driven Security provides traceable correspondence from the security model to the security configuration. The security implementation model and its meta model are read in from storage in step 110.

The described method and system (as depicted in FIG. 1 and FIG. 5) can process multiple models. This means that the overall system can be described not only by a single model expressed by a single meta model, but by multiple models describing different aspects of the system and defined in their own meta models. In order to establish associations between model elements of the different models and to separate the models from each other, a so-called "mapper model" is used. The mapper model and its motivation is described later in detail. The mapper model and its meta model are read in from storage (500) in step 115 using the "mapper model reader" (515).

In addition to the functional model and the security implementation model, the method and system uses platform and system independent, and self-confined, models of high level compliance and risk information 120 expressing security requirements, for example, but not limited to: Models describing high level compliance regulations (such as HIPAA) at a high and platform independent abstraction level; Models describing evaluation, accreditation and certification information such as Common Criteria Security Functional Classes, Security Functionality Requirements, Security Assurance Requirements, Protection Profiles and Security Targets; Models describing threats and risks, for example Attack Tree Models; and generic models describing vulnerabilities and countermeasures. Like the functional model, these separated models are defined using their own Domain Specific Languages (DSL), which again is defined in an appropriate meta meta model, for example Eclipse EMF or OMG MOF. The compliance and risks models are expressed in abstract and platform independent terms in the language of the problem domain (e.g. User, ThreatAgent, Threat, Vulnerability, Risk, Asset, Attack Tree, Attack Tree Node). They are not expressed as part of the functional model, e.g. as annotations, or in the meta model of the functional model. These security requirements models and their meta models are read in from the storage device (500) in step 120.

In step 125 the "correspondence analyzer" (525) analyzes the correspondence between the functional and security implementation on one side and the security requirements on the other side. This is done by merging the models both in graphical user interfaces (GUIs) and model transformations, e.g. to display and define associations between model elements of different models and to generate evidence (525). The generated results are then stored in step 130.

In conventional Model Driven Software Engineering (MDE) it is common to edit and process one model at a point in time. For example, model editors, such as UML tools, allow to display and edit a single UML model and its elements using a graphical editor. In a similar way, model analysis and processing is done using single models. For example, a model checker works on a single model, or a model transformation generates output models or texts from a single input model.

This method and system extends current methods by supporting the merging of functional model (s) of IT system(s) and high level policy model(s) to generate security configuration for IT system(s), for example access control rules. This approach of introducing an additional mapping layer provides clear separation of the (modeling language and middleware platform specific) functional model, the security implementation model and the abstract compliance and accreditation models.

Figure 4:
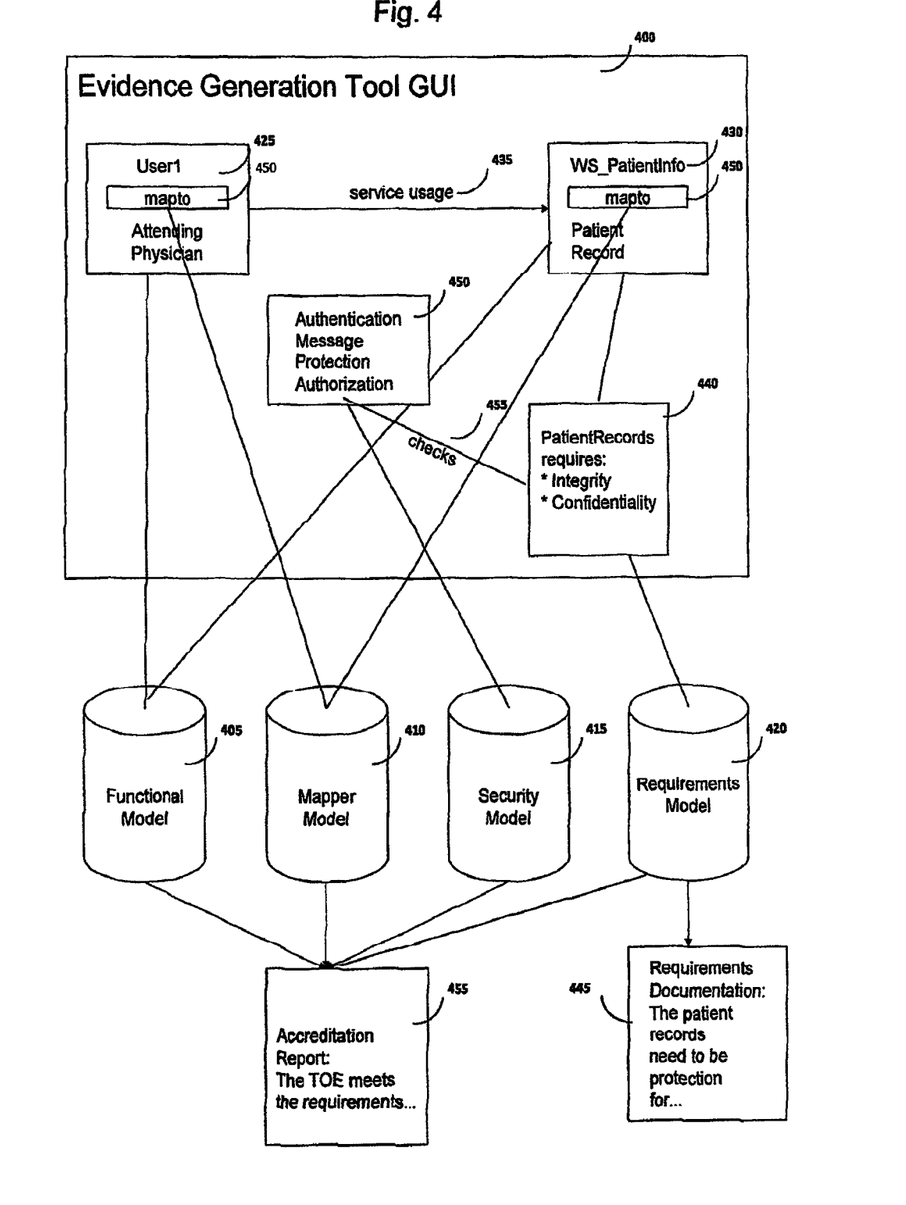
FIG. 4 illustrates a model driven risk analysis example, according to an embodiment.

Modeling specialists often use graphical editors to edit models. Human users view and edit models (steps 105 to 130, but also optionally in steps 140 to 185) by using graphical editors that merge models expressed in different meta models. The editors display for example the functional model of a system. Relevant compliance and/or relevant information is added and edited in the graphical representation of the functional model and shown on the display in a united and integrated manner, but stored as part of the separated requirements model(s) expressed in separate meta models (FIG. 4). The association between the model elements of the various models is done using a flexible mapper model and the attributes of the model elements. In another example, models are viewed and edited in separate models.

This flexible mapping of elements of different models at the same or at different layers of abstraction, in contrast to the conventional annotation of model elements, has numerous benefits over the conventional art. It decouples the different models, allows the "translation" of terms and descriptors between models, enables the abstract, meta model independent, and middleware independent definition of compliance and risk models in an appropriate domain specific language, and supports the clustering of elements into sets. It allows the description of different views of the system at the right level of abstraction, using the right term for specific aspects and views, and using the appropriate meta model/DSL. Therefore, the element mapping method and system allows the definition of the optimal vocabulary for the description of the system for a given task. It also allows the addition of attributes to the model elements of the mapper model and the definition of relationships between the elements.

The "terms" of the functional models of the concrete system are e.g. modeling language and platform specific data types, services, service interactions and users. The platform/system independent HIPPAA compliance requirements model is for example based on abstract terms like "PatientRecord" or "AttendingPhysician", which are not bound to a concrete modeling language or runtime platform. The "element mapping" method and system establishes associations, so-called "mappings", between the terms of the functional models and the terms of the compliance and risks models. See FIG. 3, which shows the functional model, the requirements model and the mapping model of a very simplified healthcare application.

Figure 3:
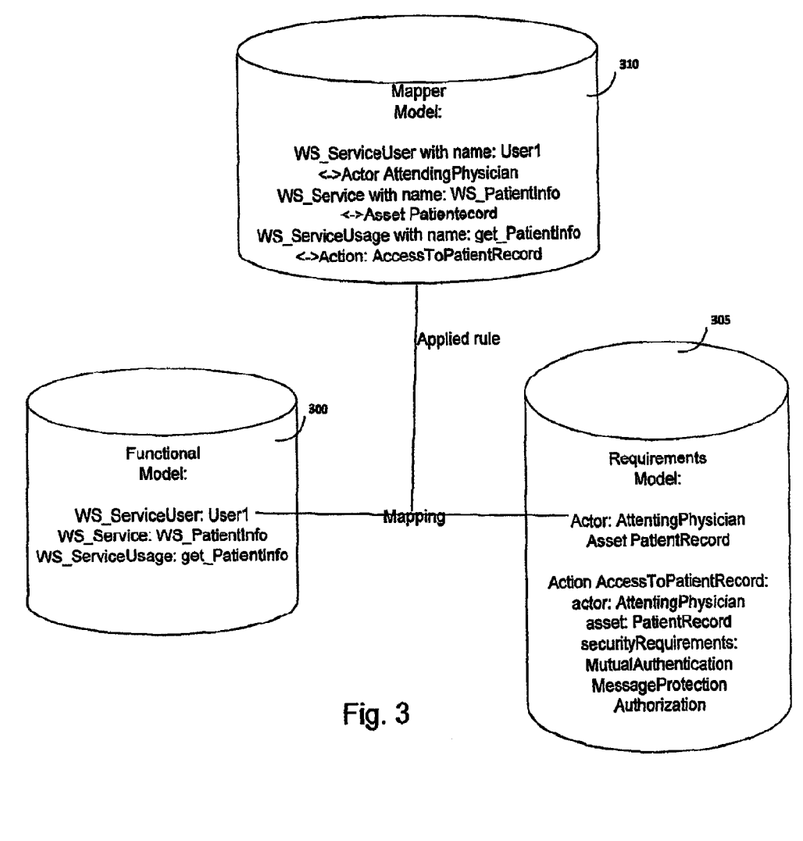
FIG. 3 illustrates a mapping between a high level compliance model (for a HIPPAA example) and low level elements of a functional model according to an embodiment.

The functional model (300 and 105) describes the functional aspects of the system, for example data formats, interfaces, services, services interactions, deployments an so on in an appropriate Domain Specific Language (DSL) or meta model. In FIG. 3, the functional model defines a Web Service WS_PatientInfo, a user WS_ServiceUser User1 and a relationship between both which describes that the User1 uses the service WS_PatientInfo to get patient information. This definition is expressed in platform specific functional DSL or a general purpose modeling language like UML, SysML or BPMN.

The requirements model (305 and 120) defines the compliance and accreditation requirements in an abstract and reusable form and in appropriate Domain Specific Language (DSL). In the HIPAA example, it defines an abstract Asset PatientRecord, an Actor AttendingPhysician and an Action. The Action AccessToPatientRecord describes that the Actor AttendingPhysician is allowed to access the Asset PatientRecord if (1) both Actor and Asset are mutually authenticated, (2) the communication between both is protected and (3) the access to the service is authorized.

The mapper model (310 and 115) establishes a mapping between the functional model and the requirements model and their elements. The mapping itself can be performed using known database search techniques. For example, the element of the functional model User1 is mapped to the element Actor AttendingPhysician and vice versa.

This allows an interpretation of the abstract requirement as: User1 is allowed to access the service WS_PatientInfo, if the invocation is mutually authenticated, protected and authorized.

In an example, there is no "platform specific" (in the terminology used by the Object Management Group's Model Driven Architecture standard, MDA) requirements model, i.e. the abstract requirements model is not fully translated to a requirements model expressed in terms of the functional DSL. The transformation algorithms to process the various models can for example use helper functions to flexibly map between the models. Such helper functions can completely hide the underlying mapping process. Alternatively, it is also possible to translate the abstract requirements model to a requirements model for a specific platform in one single step.

The mapping algorithm supports, for example, one to one, one to many, or many to one mappings and is based on a comparison of flexible, declarative descriptors supporting logical operations of arbitrary model elements (e.g. service, service interaction and user identifiers) and meta model elements (e.g. element meta types). The mapping can also be bi-directional, allowing bi-directional navigation between models and their elements. Examples for mappings are: "InformationFlow" is mapped to "All elements of type CCM::ConnectEvent" and "Vulnerability BufferOverflow" is mapped to "All elements instantiating a service with string and non-bounded arrays," which shows how the mapper can be used to cluster sets of elements.

In the following example, a Common Criteria accreditation example of a very simple healthcare system (already illustrated in FIG. 3) is further illustrated in FIG. 4. The method and system is not limited to this specific accreditation scheme, it can be generally applied to accreditation and compliance processes and schemes, etc.

The Evidence Generation Tool illustrated in FIG. 4 includes a graphical user interface (GUI, 400) and repositories storing the functional model (405 and 105), the mapper model (410 and 115), the security model (415 and 110) and the requirements model (420 and 120).

In the example of FIG. 4, a user described by the functional model element User1 (425), which is mapped to the abstract name AttendingPhysician, accesses patient info from a service WS_PatientInfo with the abstract name PatientRecord (430) using a defined service usage (435). According to the Security Model (415), which describes the protection of the system in a form traceable to the actual implementation, this service usage is protected using security functionality implementing (1) authentication, (2) message protection and (3) authorization.

For the model driven evaluation and accreditation of a system, it is necessary to ensure that the system, the Target of Evaluation (TOE), meets specific requirements defined in a Security Target (ST) or Protection Profile (PP). This includes both functional security requirements and assurance requirements. The generic Common Criteria requirements, e.g. the Security Functionality Classes, are formalized as models expressed in a Domain Specific Language (DSL). The human evaluator now describes the requirements for the TOE, for example, as list of the required elements of the SFR and SAR models (440), using the Evidence Generation Tool GUI (400). In our example, the requirements are integrity and confidentiality, which are provided by the security mechanisms authentication, message protection and authorization. Using model transformations (which are part of this method and system), the evidence generation for example automatically generates large parts of the requirements documents (445), e.g. the Common Criteria Security Target for the TOE, directly from these lists. A large group of these requirements, esp. of the functional requirements, is satisfied by system functionality and controls described in the functional and security policy models. A model transformation, which is part of the "correspondence analyzer" (525) now can automatically verify that many security and accreditation requirements are met by comparing the elements of the requirements model and of the security implementation model. For example, the requirements model states that the access to PatientRecords has to be authorized. The security implementation model elements define that for access to PatientRecords the OpenPMF Policy Management Framework is used, and that OpenPMF provides the security functionality "Authorization". Therefore, the requirement "Authorization" is met. If this automatic match is not possible, human accreditors can also prove that these requirements are met using the GUI, which is also part of the "correspondence analyzer" (525) of the Evidence Generation tool, by (manually) defining associations between the requirement model elements and an element (in the security model 110) describing a control satisfying this requirement (445) using the element mapper (450). For example, the requirements state that an interface must be protected against buffer overflow attacks. The human accreditor now proves that this requirement is met by checking the source code of the implementation of the interface and then associates the functional element representing the interface with the related element of the requirements model. In other cases, when this is not possible, the accreditor enters additional evidence and assumptions about the system into the "correspondence analyzer" (525). For example, the requirements state that the administrator has to be trusted. The accreditor states that this requirement, which cannot be checked inside the model system, is met. This additional accreditation information is then handled in the same way as the automatically generated evidence, e.g. for the generation of accreditation documentation.

In a similar way a human specialist is able to describe assets, threats, threat agents and their capabilities, vulnerabilities and the required capabilities to exploit them, risks, controls to mitigate risks, fault trees, attack trees, risks graphs and similar aspects of risk analysis in a platform and application independent way. Then the abovementioned automatic matching process or human specialist maps these elements to functional model elements and calculate for example concrete risks for specific events, as illustrated previously in step 125.

There are different ways to implement the models transformations, for example, using an imperative or declarative approach. Specialists can implement these transformations in several ways known to those skilled in the art.

In step 130, evidence is generated as models stored in repositories, by application of model-to-model transformations in the "correspondence evidence documenter" (530). It is then possible to automatically generate reports (455) (e.g. in text, MS Word document format or other formats) from the evidence repositories. It is also possible to generate documentation directly using a model-to-text transformation.

FIG. 2 illustrates examples of the different layers at which various types of evidence (including functional, security, and requirements) are collected, and lists examples of kinds of evidence that are collected in step 140 of FIG. 1:

(a) Evidence about the system design, which identifies the major subsystems of the Target of Evaluation (TOE). These can for example be the SOA services and their interactions that comprise the application and/or workflow, or the deployment of the services on nodes. This information is typically available in the form of functional models in model-driven tools and defined in a Domain Specific Language (DSL) or a standardized functional modeling language such as UML or BPMN. Implementation example: these models can be read from within the same model-driven tool environment (e.g. Eclipse), or can be exported into a separate accreditation evidence collection tool.

(b) Evidence about the security policy model, which could be an "informal policy", or potentially a "semi-formal policy" (in Common Criteria accreditation terms) thanks to the Model Driven Security approach. This information is typically available in the form of security models in Model Driven Security tools. Implementation example: these models can be used from within the same model-driven tool environment (e.g. Eclipse), or can be exported into a separate accreditation evidence collection tool.

(c) Evidence about the detailed functional description of each high-level subsystem in terms of, for example, its inputs, behaviors, outputs, (side-) effects, errors, and contextual exceptions. This functional description might have an impact on security. This information can be available in the form of functional models in model-driven tools. Implementation example: these models can be used from within the same model-driven tool environment (e.g. Eclipse), or can be exported into a separate accreditation evidence collection tool. Some of this information could also be accessed from a BPEL server (in a process driven web service environment).

(d) Evidence describing the formal security requirements (Security Target) of the Target of Evaluation (TOE) in a formalized way. This information is available as output of the requirements modeling and merging tool. It describes the functional and assurance requirements of the system (Common Criteria Security Assurance Requirement—SAR, Common Criteria Security Functional Requirement—SFR). Implementation example: Generation of the Security Target/Protection Profile (ST/PP) document from the Common Criteria requirements model using e.g. Word templates.

(e) Evidence describing how the security requirements (e.g. the Common Criteria Security Target—ST) of the Target of Evaluation (TOE) are met by corresponding controls. This information is a correlation of the security requirements (Common Criteria Security Assurance Requirement—SAR, Common Criteria Security Functional Requirement—SFR), the functional implementation models, the security compliance and implementation models and additional assumptions. Implementation example: Semi automatic and manual correlation of models, generation of a document using e.g. Microsoft Word document templates.

(f) Evidence describing risks, vulnerabilities, threats, threat agents, controls, control objectives and other compliance/accreditation requirements. This also includes evidence about the traceable relation between those model elements, e.g. the relationship between threat agents and their capabilities, vulnerabilities and required capabilities to exploit them, the resulting threats and risks, and the controls to mitigate the risks. Implementation example: read models, generated evidence, and the output from the correspondence analysis.

(g) Evidence about the transformations used to transform (using Model Driven Security) the high-level security/compliance/accreditation policies into the fine-grained, contextual policy enforcement rules. This can be formalized in Model Driven Security and provides traceability between models. This information is typically available in the form of model transformations in Model Driven Security. Evidence about the model transformations used to transform functional models into IT systems software and/or configurations using Model Driven Software Engineering (MDE) is also useful evidence that can be used to verify the correspondence between IT system(s) and functional model(s). Implementation example: these transformations (which can be expressed in a model transformation language) can be accessed/parsed from within the same model-driven tool environment (e.g. Eclipse), or can be exported into a separate evidence collection tool.

(h) Evidence about the generated low-level security rules and the IT infrastructure on which each subsystem runs. This information can be available in the form of the generated rules in Model Driven Security, and in the form of the outputs of the model-driven tools (e.g. XACML/OpenPMF PDL files). Similarly, the output software artifacts and/or configurations generated by MDE are useful evidence that can be used to analyze IT systems operations. Implementation example: this information is the output of the model-driven tool. If stored within the model-driven tool environment, it can be accessed within the same model-driven tool environment (e.g. Eclipse, OpenPMF), or can be exported into a separate accreditation evidence collection tool. Alternatively, the information can be read out of registries/repositories, and e.g. a BPEL server (in a web service environment).

(i) Evidence about runtime events (useful in case where runtime events should be considered), e.g. security (and IT systems) incidents or malfunctions. This information can for example be available through security and compliance (and IT systems operations) monitoring software agents that reside on each protected end system. These agents can transmit alerts to a central monitoring console, which can then export the alerts in a standardized form, e.g. Syslog. Implementation example: Compliance monitoring agents that reside on each protected end system can detect and transmit alerts to a central monitoring console, which can then export the alerts in a standardized form, e.g. Syslog.

(j) Evidence about the development life-cycle could include a standard boilerplate document of the model-driven approach (development/orchestration/security). This information is static and can be easily produced as a standard development lifecycle guideline manual. An implementation example can include a mostly static document in which the development life-cycle evidence would only need to be manually described once.

The mappers, model transformations and model analyzers directly reflect the models they are processing. For example, transformations and analyzers need to go through or match all elements of models, or mappers need to support all types and meta types of the concerned models. The models to be handled are described in formal meta models, the Domain Specific Languages (DSL). These DSL are also described as meta models, which are also accessible to the Model Driven Software Engineering (MDE) tools and transformations. Therefore, they are used as input models for the automatic generation of large parts of model transformations or model analyzers processing these models. This approach, which can also be used for the generation model transformations of Model Driven Security (MDS), greatly improves the assurance (i.e. the traceable correspondence between models and actual IT systems security) of the generated transformations.

Details: Detecting Changes

In steps 155 to 175 in FIG. 1, changes to the IT systems and their security are detected and analyzed. The "change detector" (555) reads in the evidence generated in steps 140 to 150 in FIG. 1. It detects changes (including consequential changes) at all layers of the system and its security, by comparing two or more previously stored (e.g. in memory, hard drive, network storage) versions of evidence in step 155. Before storing evidence, the "current evidence normalizer" (545) normalizes all evidence in step 145 using the methods and systems described above, so that all elements of the evidence are always presented in the same format, order, and without repetition. This is a prerequisite for detecting significant changes, while omitting insignificant variations in the collection process (e.g. ordering of evidence elements or repetition).

All information in an IT system can be described as a model, using various meta models and Domain Specific Languages (DSL). This includes assets, services, service implementations, service interactions, source code, configuration files and so on. All these models have versioning information as described above. For example, known software engineering methods for version control (known to those skilled in the art) are applied, such as conflict detection and resolution. This allows checking or comparing (see below) of models of different versions, either within a single model or over all dependencies in merged models.

Due to the interrelated nature of model-driven approaches and model-driven security because of formalized model transformations, the "change detector" (555) is able to detect even consequential effects of changes by comparing all evidence at all layers including model transformations. For example, a changed security policy rule for a particular service interface could have been originally triggered by a change in the workflow model.

The output produced by the "change detector" (555) is a normalized, formalized report of the changes (i.e. differences) detected between two versions of evidence, for example the current version and the prior version. This can be accomplished by using conventional version control techniques commonly known in the field of computer science implemented in the "change detector" (555).

Details: Evaluating Change Policies

The "change policy evaluator" (570) evaluates whether system or security policy changes are within the acceptable scope of the current accreditation in step 170. Based on the changes evidence from the previous steps, a "change policy reader" (565) reads the "change policy" (which can also be referred to as "re-accreditation policy") from storage in step 165, evaluates (in step 170) the change policies for the change evidence report and stores the evaluation results in step 175, using the "change policy evaluation results saver" (575). The formalized evidence allows the detection of changes and their concrete impact across the IT system(s) by the "change detector" (555). Change policies, which express which changes do or do not alter the accreditation/compliance targets, can then be evaluated by the "change detector" (555) to automatically check whether the changes are within the accepted valid bounds (defined by changes policies) of the current accreditation. If the changes do not affect the requirements boundaries, the changes can be automatically accepted by the "change decider" (560), thus not requiring manual re-accreditation, and the system can continue operation (thus enabling agility). An obvious example could be changes to the business process workflows, which would potentially happen frequently and will in many cases not affect assurance related properties. In this case, change policies define the criteria for which manual re-accreditation is not necessary and/or is necessary. If they are outside these bounds, manual corrections to the IT systems and their security, and subsequent re-accreditation can be triggered.

One main goal of the change policy evaluation method and system is that manual re-accreditation is not necessary when IT systems changes stay within the acceptable boundaries specified by the change policy. For example, for executable, model-driven IT architectures such as BPM-SOA, the method and system can avoid manual "re-accreditation" if the change policy defines the changes to the SOA orchestration that do or do not impact the accreditation/compliance. Another simple example for a change policy would be that a role change into a role that is a sub-role of the original role does not require re-accreditation, or that certain changes to security levels do not affect the accreditation. Another example would be the analysis of changes in a functional model as to how a new connection between services or a different allocation of services to a node inside and/or outside a LAN, impacts risks or an accreditation.

Thanks to the abovementioned model separation and model merging and mapping method and system, change policies can not only be expressed system specific, but also generically and technology independent as generic best practices templates for e.g. Common Criteria accreditation, which enables a high degree of re-use and separation of stakeholder concerns. For example, change policies can be specified in numerous ways: (1) One way to specify change policies is to express them directly in separate models described in an own Domain Specific Language (DSL), and use the abovementioned "model merging & mapping" (recommended, enables re-use and separation of stakeholder concerns); (2) The change policy can be defined in a GUI that merges the change policy and other models, e.g. the functional and security models, and then stored using its meta model as in (1); (3) Alternatively, change policies can be directly specified in functional models or security models, e.g. as constraints or properties for specific services/components in a UML model. (4) Alternatively, policies can be expressed in detailed low-level change policy templates using a policy language (e.g. in a notation similar to OpenPMF's Policy Definition Language—PDL, or XACML). Some (hypothetical) simple policy examples could look like this (written in an exemplary policy language (related to ObjectSecurity OpenPMF PDL):

```
//Comment:
//do not require re-accreditation for workflow interaction reconfiguration
//as long as the security policy model does not change
(change.workflow == interaction) & (change.security_transformation == NULL) : allow;
//Comment:
//do not require re-accreditation for change of a security level to a higher level
//BellLaPadula example
(change.security_level == changed _assignment_higher) : allow;
```

The "change decider" (560) now decides whether there are relevant changes or not in step 160. If the change policy evaluation does not identify any violations of the current accreditation, there is no further action required and the method and system stops in step 190, as the current accreditation is still valid. Otherwise the changes have to be evaluated (in steps 165-180).

To allow manual monitoring and auditing of the system on an ongoing basis, a "change policy evaluation results saver" (575) generates and stores a log report in step 175 with evidence, including which changes were evaluated using which change policies, and what the evaluation results were.

Details: Decision Support for Human Users

In the case where either requirements non-correspondence in step 135 or changes in step 160 have been detected, a "decision support tool" (585) presents evidence in a consolidated, human readable form to human accreditors (e.g. on a screen, 590). For example, this tool can also provide concrete guidance and recommendations for the particular situation identified, to reduce cost, time, and expertise required. In an alternative example, the evidence can be provided to another system (e.g. Intrusion Detection System, IDS) for further processing (595).

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A computer-implemented method for managing and analyzing security requirements in reusable models, the method comprising:
    reading at least one functional model from at least one storage device;
    reading at least one security implementation model;
    reading at least one requirement model; reading meta models of the models from said at least one storage device;
    at least partially automatically relating the read functional model, the read security implementation model, and the read requirements model and analyzing a correspondence between the functional model, security implementation model, and the requirements model, the correspondence indicating that requirements defined in the requirement model match with security objectives implemented by controls defined by the security implementation model;
    determining whether correspondence is or is not given based on the analysis of the correspondence; and
    at least partially automatically generating evidence based on the analysis of the correspondence and the determination.

2. The method according to claim 1, further comprising reading at least one mapper model.

3. The method according to claim 1, wherein the functional model defines a functional portion of an IT system, which includes services, components, applications, or host machines, wherein the security implementation model defines security relevant portions of the IT system, and wherein the requirement model defines requirements for compliance, accreditation, and security.

4. The method according to claim 2, wherein the mapper model defines a relation between model elements of the functional model, the security implementation model, and the requirements model.

5. The method according to claim 1, wherein the functional model, the security implementation model, and/or the requirement model are retrieved from at least one storage device that is provided to a local computer or provided via a network.

6. The method according to claim 1, wherein data is generated based on the analyzed correspondence and stored on a storage device, or is displayed on a display, printed on a printer, or communicated to one or more IT systems.

7. The method according to claim 1, wherein the generated evidence is data based on the analyzed correspondence and provided to a system for further processing, the system for further processing including an intrusion detection system, a reporting system, a monitoring system, an application management system, a decision support tool, a network management system and/or compliance management system.

8. The method according to claim 1, wherein the models are defined using their respective meta-models or Domain Specific Language, and wherein model elements are correlated using at least one mapper model that maps between the model elements of the different models defined using their respective meta-model or Domain Specific Language.

9. The method according to claim 1, wherein multiple models are merged using Graphical User Interfaces (GUI) and model transformations to correlate elements of the read models and to generate evidence and documentation.

10. The method according to claim 1, wherein compliance, security and accreditation policies are defined in separate models expressed in their respective own specific Domain Specific Language.

11. The method according to claim 1, wherein model transformations are utilized to verify that security and accreditation requirements are met by comparing elements of the requirements model and of the security implementation model.

12. The method according to claim 11, wherein the verification is performed automatically.

13. The method according to claim 1, wherein the read functional model, the read security implementation model, and the read requirements model are automatically related with the respective meta models thereof.

14. An apparatus for managing and analyzing security requirements in reusable models, the apparatus comprising:
    at least one storage device;
    a functional model reader configured to read at least one functional model stored on the storage device;
    a security implementation model reader configured to read at least one security implementation model stored on the storage device; and
    a requirement model reader configured to read at least one requirement model stored on the storage device;
    wherein, to at least partially automatically relate the read functional model, the read security implementation model, and the read requirements model and analyze a correspondence between the functional model, the security implementation model, and the requirement model, the correspondence indicates that requirements defined in the requirement model match with security objectives implemented by controls defined by the security implementation model; and wherein electronic data is at least partially automatically generated that represents evidence based on the analysis of the correspondence.

15. The apparatus according to claim 14, wherein the functional model defines a functional portion of an IT system, which includes services, components, applications, or host machines, wherein the security implementation model defines security relevant portions of the IT system, and wherein the requirement model defines a compliance, accreditation and security requirements.

16. The apparatus according to claim 14, further comprising a correspondence decider configured to determine whether correspondence is or is not given based on the analysis of the correspondence analyzer.

17. The apparatus according to claim 14, further comprising a decision support tool for providing the electronic data representing information based on the analysis of the correspondence to an operator readable medium.

18. The apparatus according to claim 17, wherein the operator readable medium includes a display device.

19. The apparatus according to claim 14, further comprising:
- a current evidence normalizer configured to normalize an evidence; a change detector configured to identify a difference between at least two normalized evidence versions; and
- a change policy decider configured to decide whether changes are significant and to provide an operator with information based on identified differences between the at least two normalized evidence versions.

20. The apparatus according to claim 14, wherein the correspondence analyzer configured to automatically relate the read functional model, the read security implementation model, and the read requirements model with the respective meta models thereof.

* * * * *